(12) United States Patent
Yu

(10) Patent No.: US 6,475,005 B2
(45) Date of Patent: Nov. 5, 2002

(54) ELECTRICAL CARD CONNECTOR

(75) Inventor: Hung-Chi Yu, Hsi-Chih (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/843,477

(22) Filed: Apr. 25, 2001

(65) Prior Publication Data

US 2002/0146923 A1 Oct. 10, 2002

(30) Foreign Application Priority Data

Apr. 4, 2001 (TW) ...................................... 90205204 U

(51) Int. Cl.[7] ............................................... H01R 13/62
(52) U.S. Cl. ...................................... 439/157; 439/108
(58) Field of Search ................................. 439/157, 607, 439/608, 609, 610, 64, 541.5, 108, 939

(56) References Cited

U.S. PATENT DOCUMENTS 5,725,394 A * 3/1998 Banakis et al. ............. 439/607

* cited by examiner

Primary Examiner—P. Austin Bradley
Assistant Examiner—Ross Gushi
(74) Attorney, Agent, or Firm—WeiTe Chung

(57) ABSTRACT

An electrical card connector (100) comprises an insulative housing (200) having a base (201) and a pair of side arms (203) parallelly extending forward from two sides of the base, a number of terminals (300) received in the base of the insulative housing, a shell (600) covering the insulative housing and comprising a body (601) and a pair of sidewalls (603) extending vertically from opposite sides of the body, and an ejector (500) mounted to one of the two sidewalls of the shell and a grounding plate (400). Each sidewall integrally forms an opening (605) and a stamped spring arm (606) connected with two opposite peripheral edges of the opening and bent inward to extend as a crossbeam therebetween so as to electrically connect with IC card which inserts in the electrical card connector and perform ESD function.

3 Claims, 4 Drawing Sheets

ELECTRICAL CARD CONNECTOR

BACKGROUND OF THE INVENTION

1. Field of the Invention

The present invention relates to an electrical card connector mounted onto a printed circuit board (PCB), and particularly to an electrical card connector having an improved shell.

2. Description of the Prior Art

As the popularity of notebook computers increases, integrated circuit (IC) cards are becoming more common for increasing storage capacity or for interfacing the notebook computers with other devices. Electrical card connectors are commonly used to connect motherboards of the computers with the cards. Most current IC cards and card connectors conform to the standard of Personal Computer Memory Card International Association (PCMCIA). Usually, the electrical card connector includes a shell which can electrically connect with the outer face of the IC card and perform electrostatic discharge (ESD) function.

Referring to FIG. 4, a conventional electrical card connector 1 includes an insulative housing 2, a plurality of terminals 3 received in the insulative housing 1, a grounding 4, a rejecter 5 and a shielding 6. The shielding 6 includes a body 66 and a pair of sidewalls 60 extending vertically from opposite sides of the body 60. The front of each side wall 60 defines an opening 62 and a spring arm 64 extending from a front peripheral edge of the opening 62 in a rearward direction into the opening 62 so that, when IC card is inserted into the electrical card connector 1, the free end 68 of the spring arm 64 can electrically connect the outer face of IC card to effectuate electrostatic discharge (ESD) function.

However, a large gap is present between the free end 68 of the spring arm 64 and a rear peripheral edge of the opening 60 such that the free end 68 of the spring arm 64 is easily hitched by something extending into the opening occasionally and becomes deformed. In this situation, the deformed spring arm 64 will not be able to perform its intended function.

Hence, an improved electrical card connector is desired to overcome the disadvantages of the prior art card connector.

SUMMARY OF THE INVENTION

An object of the present invention is to provide an electrical card connector whose spring arm can electrically connect the outer face of IC card and perform ESD reliably.

An electrical card connector in accordance with the present invention comprises an insulative housing having a base and a pair of side arms parallelly extending forward from two sides of the base, a plurality of terminals received in the base of the insulative housing, a shell covering the insulative housing and comprising a body and a pair of sidewalls extending vertically from opposite sides of the body, and an ejector mounted to one of the two sidewalls of the shell and a grounding plate. Each sidewallintegrally forms an opening and a stamped spring arm connected with two opposite peripheral edges of the opening and bent inward to extend as a crossbeam therebetween so as to electrically connect with IC card which inserts in the electrical card connector and perform ESD function.

Other objects, advantages and novel features of the invention will become more apparent from the following detailed description of the present embodiment when taken in conjunction with the accompanying drawings.

DETAILED DESCRIPTION OF THE INVENTION

Figure 1:
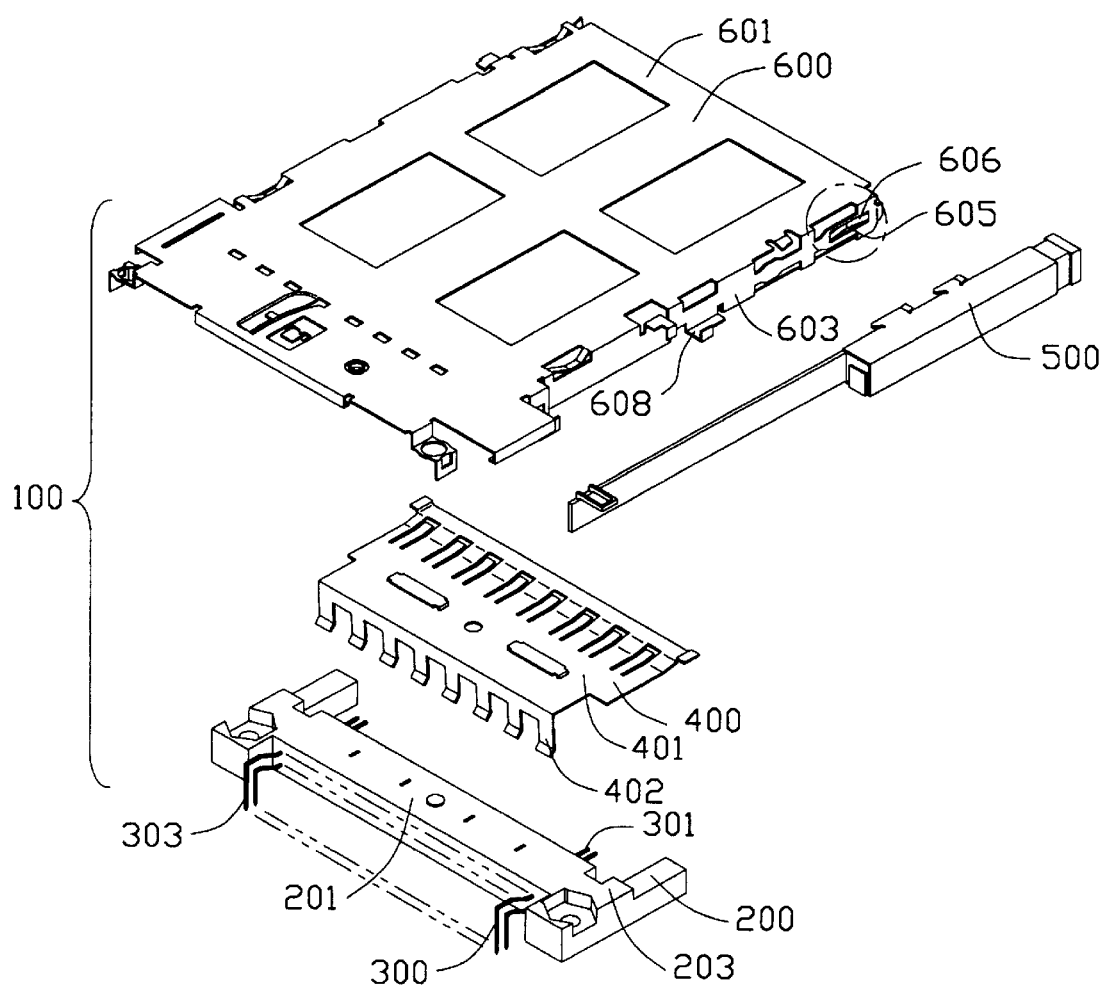
FIG. 1 is an exploded perspective view of an electrical card connector in accordance with the present invention.

Referring to FIG. 1, an electrical card connector 100 in accordance with the present invention comprises an insulative housing 200, a plurality of terminals 300, an ejector 500 and a shell 600. Usually, a grounding plate 400 is also present in such type of card connector.

The insulative housing 200 comprises a base 201 and a pair of side arms 203 parallelly extending forward from two sides of the base 201. The terminals 300 are received in the base 201 of the insulative housing 200. An engaging section 301 of each terminal 300 extends from the front end of the base 201 and a mounting portion 303 of each terminal 300 extends from the rear end of the base 201. The engaging sections 301 can electrically connect with an IC card (not shown) and the mounting portions 303 can electrically connect the terminals 300 onto a printed circuit board (not shown).

The grounding plate 400 comprises a contacting portion 401 and a plurality of contacting legs 402 extending vertically downward from the rear side of the contacting portion 401.

The shell 600 comprises a body 601 and a pair of sidewalls 603 extending vertically from opposite sides of the body 601. The front end of each sidewall 603 defines an opening 605. Also referring to FIG. 2, a stamped spring arm 606 connects with two opposite peripheral edges of the opening 605 and extends therebetween. Also, the middle of the spring arm 606 is bent and defines a bending portion 607. An U-shaped supporting portion 608 extends outward from the middle of each sidewall 603.

Figure 2:
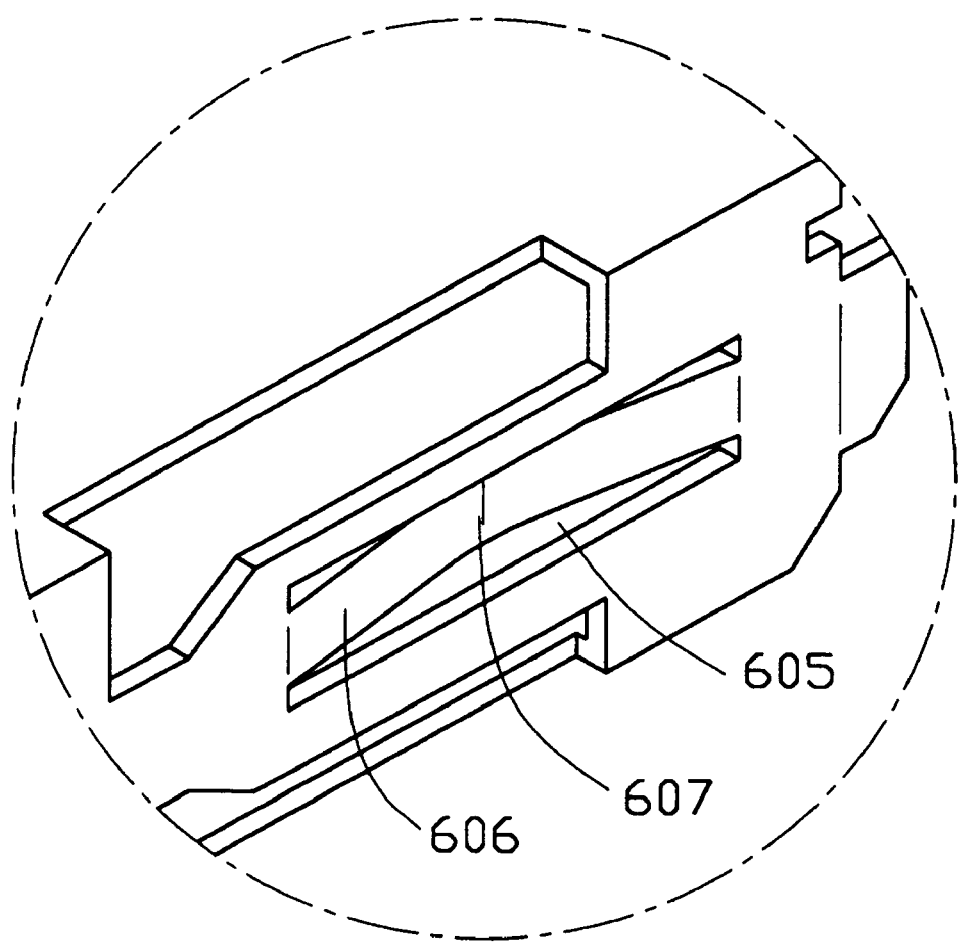
FIG. 2 is an enlarged view showing a portion of a connector shell.
Figure 3:
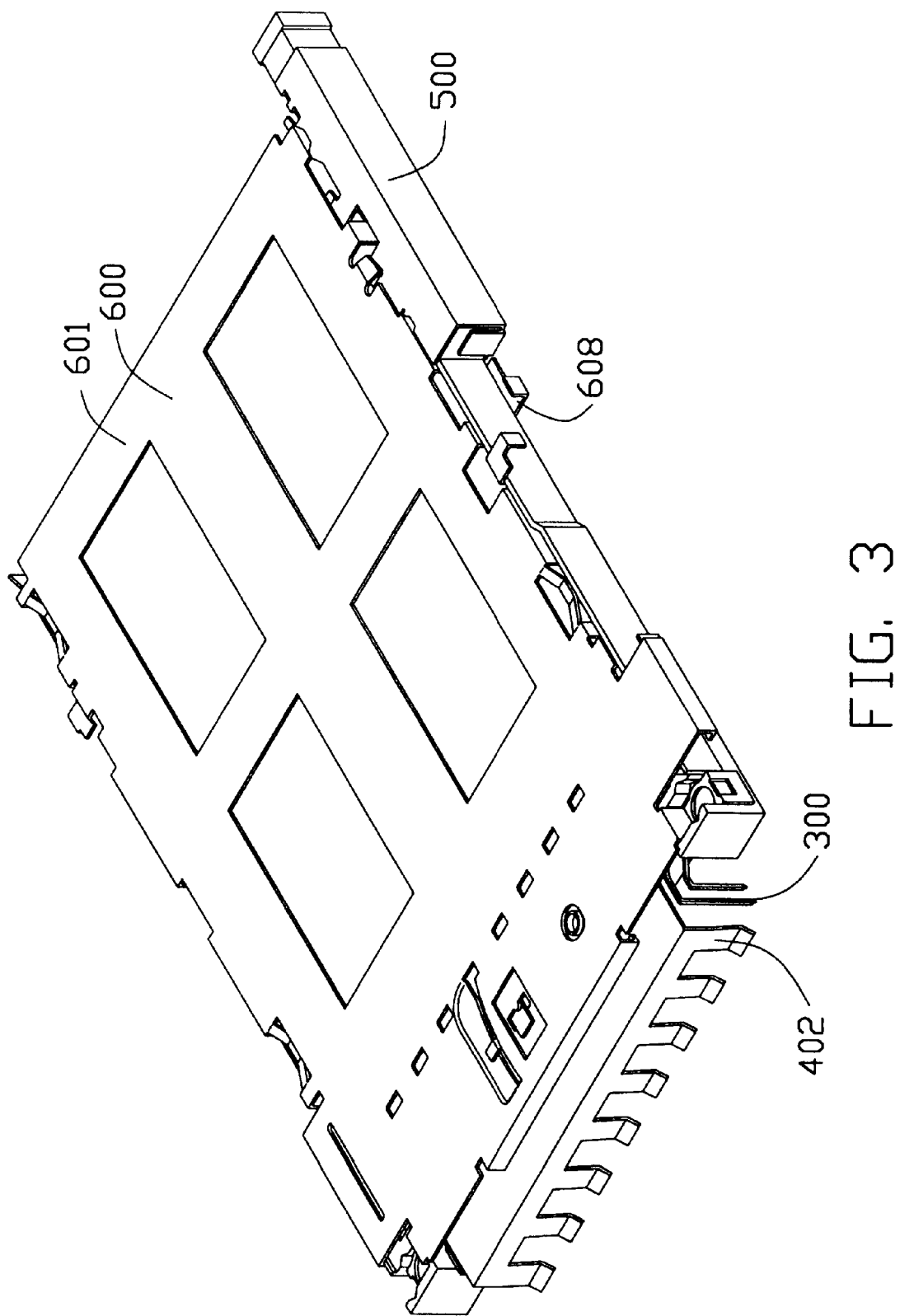
FIG. 3 is an assembled perspective view of FIG. 1.
Figure 4:
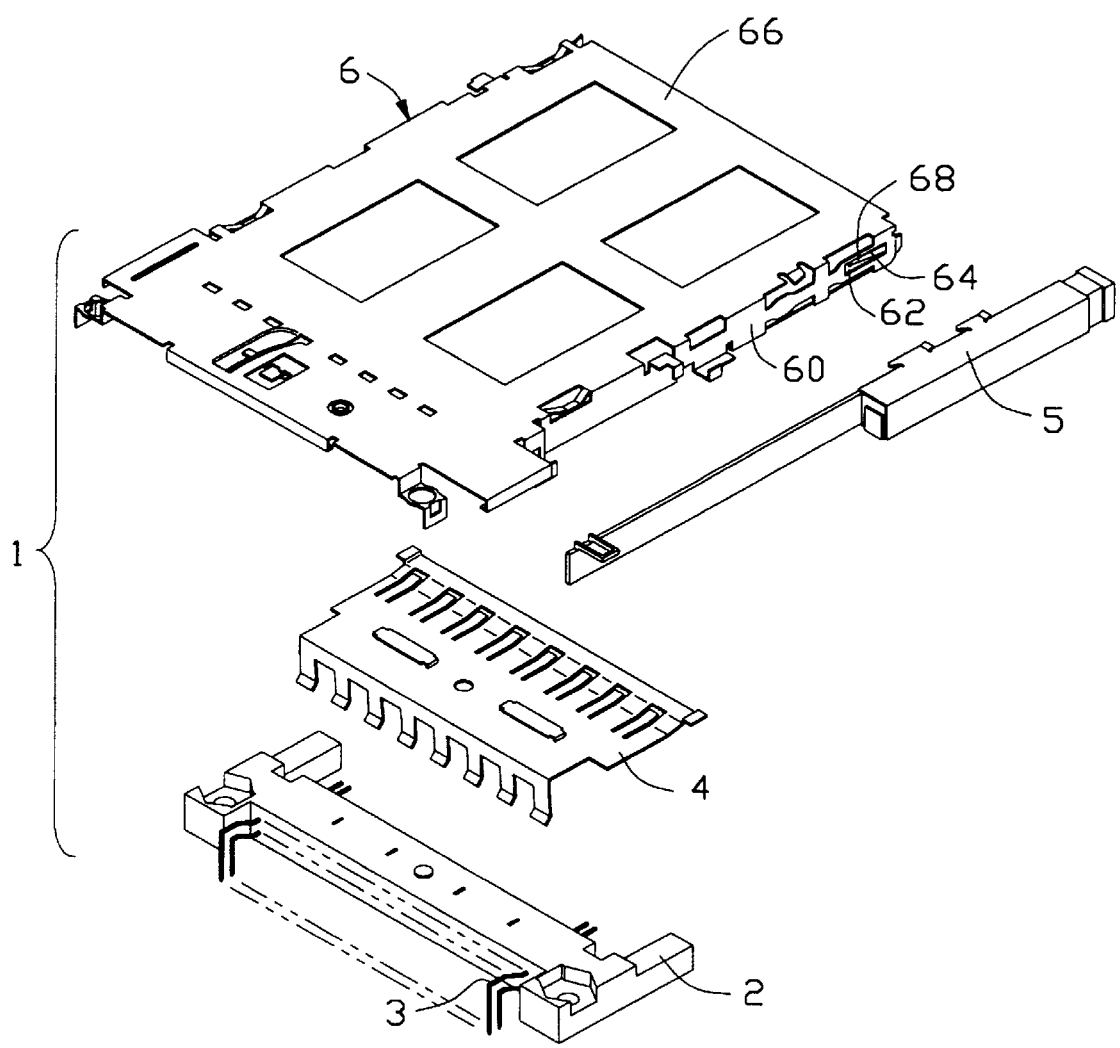
FIG. 4 is an exploded perspective view of a conventional electrical card connector.

Referring to FIGS. 1 through 3, in assembly, the grounding plate 400, the ejector 500 and the shell 600 are mounted to the insulative housing 200. The contacting portion 401 is placed between the body 601 of the shell 600 and the base 201 of the insulative housing 200 and electrically connects the body 601. The ejector 500 is mounted to one of the two sidewalls 203 of the shell 600 and supported by the supporting portion 608 of the shell 600.

When inserting IC card into the electrical card connector 100, the spring arm 606 can electrically connect with the outer face of IC card by its bending portion 607 so as to perform ESD function by the grounding plate 400 connected with the PCB. Because the spring arms 606 are integrally stamped and formed by the shell 600 and its two ends connect with the sidewalls 603 steadily, the spring arms 606 will not be hitched by something extending into the opening occasionally and becomes deformed. So the electrical card connector 100 in accordance with the present invention can perform ESD function reliably and make the transmission of the signals steady.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector, comprising:

an insulative housing comprising a base and a pair of side arms parallelly extending forward from two sides of the base;

a plurality of terminals received in the base of the insulative housing;

a shell covering the insulative housing and comprising a body and a pair of sidewalls extending vertically from opposite sides of the body, each sidewall integrally forming an opening and a generally straight stamped spring arm connected with two opposite peripheral edges of the opening and bent inward to extend as a crossbeam therebetween, the spring arm extending along a longitudinal direction of said each sidewall and having a bending portion at a middle thereof adopted for electrically engaging with an IC card inserted into the connector; and an ejector mounted to one of the two sidewalls of the shell.

2. The electrical card connector as claimed in claim 1, further comprising a grounding plate be fixed to the insulative housing and electrically connected with the body of the shell.

3. An electrical card connector, comprising:

an insulative housing comprising a base and a pair of side arms parallelly extending forward from two sides of the base;

a plurality of terminals received in the base of the insulative housing;

a shell covering the insulative housing and comprising a body and a pair of sidewalls extending vertically from opposite sides of the body, each sidewall integrally forming an opening and a generally straight stamped spring arm inwardly bowed along a longitudinal direction of the corresponding sidewall and bridging two vertical opposite peripheral edges of the opening.

* * * * *